2,829,133

PROCESS FOR POLYMERIZING VINYL CHLORIDE IN AQUEOUS DISPERSION

Robert De Coene, Ixelles-Brussels, Belgium, assignor to Solvic Société Anonyme, Brussels, Belgium, a Belgian company No Drawing. Application March 26, 1954
Serial No. 419,082

Claims priority, application Netherlands March 31, 1953

2 Claims. (Cl. 260—92.8)

This invention relates to a process for preparing polyvinyl chloride which, though of high molecular weight, may be readily plasticized.

It is known that the behavior of polyvinyl chloride to plasticizing is related to the molecular weight of the polymer. It is known in particular that the lower the mean molecular weight of the polymer the lower is the temperature and the shorter is the time required for plasticizing. On the contrary the mechanical properties and the heat stability of polyvinyl chloride improve with the molecular weight of the polymer.

It is further known that the ease with which the polymer may be plasticized is influenced by its physical structure. A polymer obtained by emulsion polymerization will, for example, plasticize at a temperature about 5° C. below that of a polymer having the same mean molecular weight but obtained in granular form by polymerization in aqueous dispersion.

The invention consists in a process for preparing polyvinyl chloride of high molecular weight having excellent mechanical properties and good heat stability and capable of plasticizing under identical conditions at a temperature about 20° C. lower than commonly available polymers of the same molecular weight.

The process according to the invention is characterized in that monomeric vinyl chloride is polymerized in aqueous dispersion with agitation in the presence of a protective colloid, and of a polymerization catalyst soluble in the monomer, said monomer being introduced in a polymerization autoclave continuously at such rate that the pressure in the autoclave will keep as high as possible but lower than the saturation pressure of the monomer at the working temperature.

When working under such conditions a very small portion of monomeric vinyl chloride will dissolve in water, another portion will be absorbed by the polymer that is already present and the remainder will be in the gaseous state; but the monomer will never be present in the dispersed liquid state.

The polyvinyl chloride obtained according to the new process has a molecular weight equal to that of the polymers that are obtained by means of the known processes of polymerizing in emulsion or in a granular form. Polyvinyl chloride according to the invention is obtained in the form of minute grains, which are highly porous and readily absorb plasticizers, and which may be plasticized at a temperature about 20° C. below that required for plasticizing known polymers of the same molecular weight.

Continuous introduction of the monomer and constant pressure in the polymerization autoclave are advantageously brought about by connecting the vapor space of the autoclave to a tank containing vinyl chloride in liquid form and kept at a temperature slightly below that at which polymerization is to be carried out.

The invention will be illustrated in greater detail by means of the following specific example.

Example 3 liters of water, 12 gms. of benzoyl peroxide and 15 gms. of polyvinyl alcohol are introduced in an autoclave of 5 liters capacity, provided with a stirrer rotating at 300 revolutions per minute. The autoclave is evacuated of air and the temperature set to 50° C.

Monomeric vinyl chloride is introduced into the autoclave progressively in such a manner that the pressure in the autoclave is maintained between 7.10 and 7.15 kg. per cm.$^2$. Polymerization is stopped after 12 hours, by which time 1 kg. of monomeric vinyl chloride has been introduced in the autoclave.

The polyvinyl chloride obtained is in the form of grains having a size of about 0.05 mm. and a molecular weight characterized by a K value of 65 (Fikentscher's scale).

Plasticizing may be readily carried out without plasticizer at 145° C. By the addition of 40% of dioctyl phtalate plasticizing may be carried out readily at 135° C.

I claim:

1. A process for polymerizing vinyl chloride in aqueous dispersion, which comprises introducing monomeric vinyl chloride in gaseous form into a polymerization zone with agitation in the presence of a protective colloid and in the presence of a polymerization catalyst soluble in said monomeric vinyl chloride and effective to polymerize the vinyl chloride, said monomeric vinyl chloride being introduced continuously into said polymerization zone at a rate such that the pressure in the zone will be as high as possible but lower than the saturation pressure of said monomeric vinyl chloride at the polymerization temperature, whereby said monomeric vinyl chloride remains in gaseous form at all times and a granular polymer is formed interrupting introduction of said monomeric vinyl chloride, and removing the polymer from said zone.

2. A process for polymerizing vinyl chloride in aqueous dispersion, which comprises introducing monomeric vinyl chloride in gaseous form into a polymerization zone with agitation in the presence of about 12 parts by weight of benzoyl peroxide and about 15 parts by weight of polyvinyl alcohol in about 3000 parts by weight of water, said polymerization zone being freed from air, polymerization being carried out at about 50° C. and about 1000 parts by weight of said monomeric vinyl chloride being introduced into said zone continuously at a rate such that the effective pressure in said zone is maintained between about 7.10 and about 7.15 kg. per cm.$^2$ at said temperature, whereby said monomeric vinyl chloride remains in gaseous form at all times and a granular polymer is formed, interrupting introduction of said monomeric vinyl chloride, and removing the polymer from said zone.

References Cited in the file of this patent

UNITED STATES PATENTS 2,511,593    Lightfoot _____ June 13, 1950

OTHER REFERENCES

"Vinyl and Related Polymers," Schildknecht, Wiley and Sons Inc., New York, 1952, p. 394.